March 26, 1974  H. UNDERWOOD, JR  3,799,746
APPARATUS FOR MANUFACTURING ANHYDROUS ALUMINUM CHLORIDE
Original Filed April 30, 1970
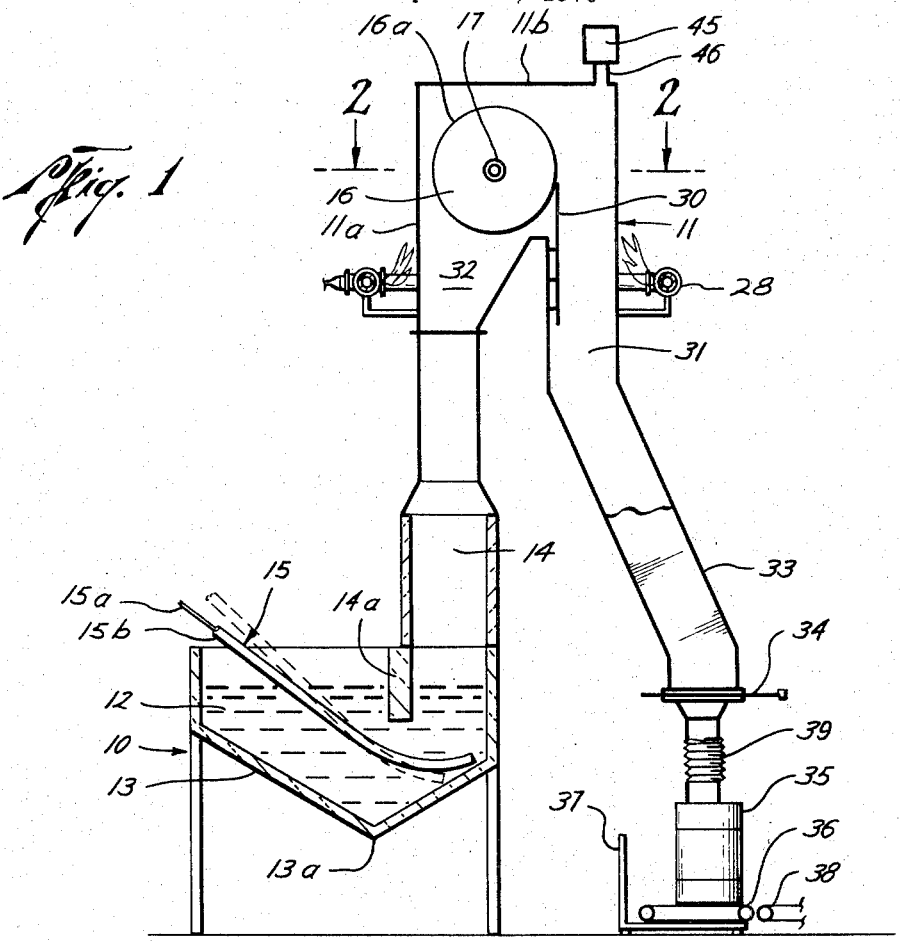
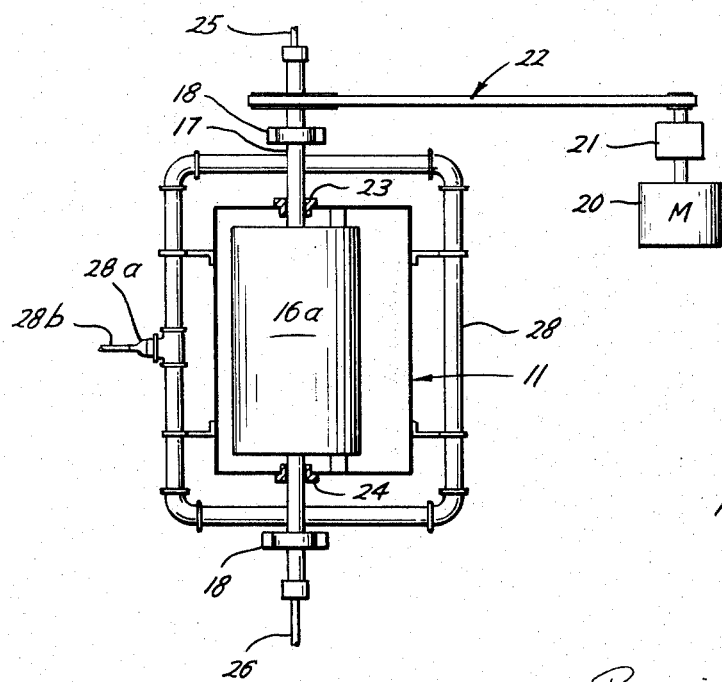
Harris Underwood, Jr.
INVENTOR.
BY Browning, Hyer, Eickmroht + Thompson
ATTORNEYS United States Patent Office 3,799,746
Patented Mar. 26, 1974

3,799,746
APPARATUS FOR MANUFACTURING ANHYDROUS ALUMINUM CHLORIDE
Harris Underwood, Jr., P.O. Box 352,
La Porte, Tex. 77571
Continuation of application Ser. No. 33,304, Apr. 30, 1970, which is a continuation-in-part of application Ser. No. 703,377, Feb. 6, 1968, both now abandoned. This application Oct. 29, 1971, Ser. No. 193,688
Int. Cl. C01f 7/58
U.S. Cl. 23—263                    1 Claim

ABSTRACT OF THE DISCLOSURE

A reactor tank in which a stream of chlorine gas is injected into a molten pool of aluminum having a temperature between 1300° F. and 1500° F. to produce gaseous aluminum chloride. A conduit from said tank to a condenser in which the gas is condensed on the side of a rotating cylinder and scraped therefrom by a knife or scraper located on the downstream side of the cylinder. Only the cylinder is maintained at a temperature below the temperature at which the aluminum chloride condenses.

---

This is a continuation of application Ser. No. 33,304, filed April 30, 1970, now abandoned which is a continuation-in-part of patent application Ser. No. 703,377, filed Feb. 6, 1968, and now abandoned entitled "Method and Apparatus for Manufacturing Anhydrous Aluminum Chloride."

This invention relates to a method of an apparatus for manufacturing anhydrous aluminum chloride, wherein the product is obtained by condensing gaseous aluminum chloride.

Anhydrous aluminum chloride has been manufactured for many years by combining chlorine gas and molten aluminum in a reactor to produce gaseous aluminum chloride. In its gaseous state the aluminum chloride is conducted to a condenser, where it collects on the cooler surfaces of the condenser as a solid material. At the present time, the condenser most commonly used comprises a cylindrical tank with a flat head and a coned bottom. The aluminum chloride crystals collect on the inner walls of the tank, which are at a temperature low enough to cause the gaseous aluminum chloride to condense. Periodically, a valve at the lower end of the coned bottom is opened and the walls of the tank are subjected to a hammering, usually, by workmen using sledge hammers. This knocks the aluminum chloride crystals from the inner walls of the tank. The crystals drop through the open coned bottom, usually, onto a conveyor, which carries the product to a mill. There it is crushed, screened, and packaged. The crushing and screening is necessary usually because the size of the particles of aluminum chloride that are knocked from the walls of the condenser tanks vary considerably and are usually larger than desired. This entire operation must be conducted in an atmosphere of inert gas or dry air to keep the degradation of the product to a minimum.

The condensing temperature of the tanks depends on the ambient temperature. Therefore, the condensing temperature will vary between day and night and between summer and winter. This, of course, affects the rate of condensation of the gaseous aluminum chloride and causes fluctuations in the production of a given unit. Further, with this process the product is produced intermittently, since it is only produced as the condenser walls are hammered. Other obvious disadvantages of this system are the manual labor involved and the short life of the condenser tanks due to the pounding they must receive in operation.

It is an object of this invention to provide an improved method of and apparatus for condensing gaseous aluminum chloride wherein the condensing temperature can be accurately controlled and the condensation of the gaseous aluminum chloride and its removal from the condensing surface is a continuous uninterrupted operation.

It is another object of this invention to provide a condenser for condensing gaseous aluminum chloride that will permit the particle size of the product to be varied.

It is yet another object of this invention to provide an improved method of an apparatus for condensing aluminum chloride that will produce the product in particles of the desired size, thereby eliminating the steps of crushing and screening the product.

The chlorine gas is injected into the molten aluminum in the reactor through a tube or lance. This lance must be made of a material that will withstand the high temperature to which the molten aluminum is raised by the exothermic reaction of the aluminum and the chlorine. Graphite tubes are commonly used. These tubes are very fragile and must be handled very carefully. Further, since the depth of the end of the tube below the surface of the molten aluminum is changed from time to time, it is desirable to have a curved lance which can rest on the bottom of the reactor and allow the depth at which the chlorine is injected to be readily changed. Therefore, it is another object of this invention to provide a new and improved curved lance through which chlorine gas can be injected into the pool of molten aluminum in the reactor to produce gaseous aluminum chloride.

It is another object of this invention to provide a reactor, in which the molten aluminum is supported for reacting with the gaseous chlorine, which will collect any impurities in the aluminum with which the reactor is charged for easy removal periodically from the pool of molten aluminum.

These and other objects, advantages, and features of this invention will be apparent to those skilled in the art from a consideration of this specification, including the attached drawings and appended claims.

The invention will now be described in connection with the attached drawings, in which:

FIG. 1 is a vertical, cross-sectional view through an aluminum chloride manufacturing plant for practicing the method of this invention and which includes the preferred embodiment of the apparatus of this invention; and FIG. 2 is a sectional view along line 2—2 of FIG. 1.

The manufacturing plant of FIG. 1 includes reactor section 10 and condenser section 11. In the reactor section, pool 12 of molten aluminum is supported in refractory lined tank 13. This pool of molten aluminum is maintained at a temperature of between 1300° F. and 1500° F. External heat is supplied to melt the initial charge of aluminum and to raise it to this temperature. After the plant is in operation, however, little if any external heat is required because the reaction between the aluminum and the chlorine gas is exothermic. Chlorine gas is introduced into the molten aluminum through tube or lance 15.

The aluminum used usually contains about 8% or so of impurities. These impurities will settle to the bottom of tank 13 and accumulate into a substantial amount if not removed. Therefore, in accordance with one aspect of this invention, the bottom of tank 13 slopes downwardly to point 13a. The impurities in the molten aluminum collect at point 13a, where the dross can be easily removed by a conventional laddling bucket. If the impurities are not removed periodically, they will concentrate to the point where they will produce by-products, which will be collected with the aluminum chloride. Many of these impurities, such as ferrous chloride, are particularly undesirable.

Point 13a is located outside of baffle 14a, which is one of the walls of riser pipe 14. The other three walls are connected to the walls of tank 13 and combine with baffle 14a, which extends into the molten aluminum, to isolate a portion of the surface of the molten aluminum pool from the outside atmosphere. Chlorine gas is introduced through lance 15 into the molten aluminum at a point below riser pipe 14. The aluminum and chlorine combine to produce gaseous aluminum chloride, which rises upwardly from the aluminum pool into riser pipe 14 and is drawn into condenser section 11. While traveling through the riser pipe, any entrained aluminum may separate and fall back into pool 12. The lower part of the riser pipe is insulated to keep the gaseous aluminum chloride well above its condensing temperature, while passing through the fall-out zone.

Tube or lance 15 comprises a central tube 15a of metal and an outer covering 15b of refractory material. By using a metal tube it can be bent to the desired shape before the refractory covering is applied. Most metals when heated to the temperature of the molten aluminum pool will react with the chlorine. For example, the preferred nickel alloy tube will react with the chlorine and form nickel chloride if it is heated to the temperature of the pool, which is around 1500° F. as stated above. To prevent this, the coating of refractory is applied. This along with the cooling effect of the chlorine flowing through the tube keeps its temperature below that at which the metal of the tube will react with the chlorine. In the preferred embodiment, a ¼″ diameter tube of nickel alloy is bent to the desired shape. It is then encased in refractory sold under the trademark "Mill Mortar" by Kaiser Refractory until the lance is about 2″ in diameter. The refractory is mixed with water to form a putty-like material before it is applied to the tube. It is applied in successive layers with each layer being allowed to dry and harden before the next layer is added.

Preferably, the lance is bent to curve under baffle 14a and lie along the bottom of reactor 13 as shown. The distance the chlorine is discharged below the surface can be increased by simply pulling the lance back to cause its outer end to move down the inclined bottom of the reactor to the dotted line position shown in FIG. 1. The distance below the surface that the gas is injected is changed to vary the characteristics of the product. At one depth the aluminum chloride is yellow in color because of an excess in chlorine. By lowering the point of injection, the color of the product is changed to gray, due to an increase in the amount of free aluminum. Some consumers of aluminum chloride like a yellow product, whereas others prefer gray.

Located in condenser 11 are means providing a cool moving surface upon which the gaseous aluminum chloride may condense. In the embodiment shown, cylinder 16 is supported for rotation in condenser section 11 by shaft 17. The condenser section is rectangular having side walls 11a and top 11b. Shaft 17 extends through opposite side walls of the condenser housing and is supported by bearings 18. Shaft 17 and cylinder 16 are rotated by motor 20 through speed reducer 21 and belt drive 22. Shaft seals 23 and 24 keep the gases in the condenser housing from escaping through the openings provided for shaft 17.

Shaft 17 and cylinder 16 are hollow and water or any other convenient coolant is pumped into shaft 17 through inlet tube 25 and removed therefrom through outlet tube 26. In this way, the condensing drum surface 16a of cylinder 16 can be maintained at any desired temperature by controlling the inlet temperature and volume of the cooling fluid. The walls of the condenser housing are maintained above the temperature at which aluminum chloride sublimes which is 360° F. Gas heater 28 is strategically located to maintain the walls of the condenser section above this temperature, preferably between 380° F.–700° F. The heater is made up of perforated pipe, which encircles the condenser housing. Gas is introduced into mixing chamber 28a through line 28b. Air is mixed with the gas in the mixing chamber and the mixture flows into the pipe and out the perforation where it is burned. Preferably, the temperature at inlet 32 should be in the range of 400° F.–550° F. Curved side surface 16a of cylinder 16 is cooled below the 360° F. condensing point of the aluminum chloride so most of the gases flowing into condenser 11 will condense on this surface. The end walls of cylinder 16 will usually be below 360° F., also. This will cause some of the gases to condense on these ends. The build-up cannot proceed to the point where it will interfere with the rotation of the drum, however, because the heat of the walls will end the build-up before that happens. Thus, by keeping the walls of the condenser section above the condensing temperature of the gases, aluminum chloride cannot build up on the walls and eventually clog up the condenser completely.

Scraper means are located on the downstream side of cylinder 16 to scrape the condensed aluminum chloride from the curved side surface of the cylinder as the cylinder rotates. In the embodiment shown, scraper 30 is mounted above outlet 31 of the condenser section and downstream from the gaseous aluminum chloride entering the condenser section through inlet 32. As the solidified aluminum chloride is scraped from the side walls of cylinder 16, it falls downwardly through outlet 31 into discharge tube 33. Slide valve 34 controls the flow of the aluminum chloride out of tube 33. Usually, the valve is closed only long enough to allow the container in which the aluminum chloride is collected, in this case drum 35, to be exchanged for an empty drum when it has been filled. The drum rests on a short conveyor belt 36, which is supported by scales 37. By weighing each drum as it is filled, each drum can be filled with the same weight of material. When the drum is filled, it is sealed and moved away by conveyor 38. Discharge chute 39 is sufficiently flexible to permit the drums to be changed out. Instead of collecting the product in a drum, as shown, it could be discharged from outlet 31 into a sealed bin or other bulk container or onto a conveyor that will introduce the product directly into the process in which it is to be used.

By changing the speed of rotation of cylinder 16, the particle size of the solidified aluminum chloride can be adjusted. This can be done by changing the size of the pulleys in the belt drive if motor 20 is of the constant speed type. Other means for varying the speed can be employed, such as a variable speed reducer or a variable speed motor. It has been found that the slower the cylinder rotates, the thicker the aluminum chloride layer will be when it reaches scraper 30. The thicker this layer, generally speaking, the larger will be the crystals of aluminum chloride falling downwardly into container 35. For example, in one test the drum was rotated at 6 r.p.m. and the aluminum chloride crystals were so small the product resembled a fine powder. In another test, with the drum slowed to ¾ r.p.m., the aluminum chloride was produced as flakes averaging about ¼″ to ⅜″ in width. The product size can be varied between these two limits by varying the speed of the drum between ¾ to 6 r.p.m. Other speeds and different drum sizes would provide other variations in product size.

One way of tying particle size down so that the figure can be applied to plants of various size is to relate particle size to the total square inches of drum surface scraped for a given production. For example, a product about the size of a silver dollar and about one-eighth of an inch thick is produced when some 3800 square inches of drum surface pass by the scraper blade for each pound of product. Conversely, a finely powdered aluminum chloride is produced when about 22,600 square inches of drum surface pass by the scraper blade for each pound of aluminum chloride produced. A relatively coarse powder is produced when the surface area scraped per pound is about 5360 square inches.

It is important to isolate the aluminum chloride, both in the gaseous and solid states, from water. Therefore, the condenser should be sealed from the outside atmosphere, which will contain water vapor. To prevent an excessive build-up of pressure in the condenser due to some malfunction, relief valve 45 is connected to the inside of the condenser through vent pipe 46.

From the foregoing, it will be seen that this invention is one well adapted to attain all of the ends and objects hereinabove set forth, together with other advantages which are obvious and which are inherent to the method and apparatus.

It will be understood that certain features and subcombinations are of ultility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been dscribed, what is claimed is:

1. Apparatus for producing anhydrous aluminum chloride comprising a reactor section and a condenser section to receive the gases from the reactor section, said reactor section including means for containing a pool of molten aluminum comprising an open container having an inlet and outlet formed by a baffle extending across the open container that divides the container into an upwardly opening inlet and an upwardly opening outlet, said baffle being spaced from the bottom to allow molten aluminum to flow from one side of the baffle to the other, a conduit to conduct the gaseous aluminum chloride from the outlet on one side of the baffle to the condenser section, means for injecting chlorine gas into the molten aluminum to produce gaseous aluminum chloride comprising a lance extending into the container through the inlet, below the baffle, and into the portion of the container below the outlet to cause the reaction between the aluminum and chlorine to occur below the outlet, said condensing section including a housing having an inlet and an outlet, a cylinder rotatably mounted in the housing, means for rotating the cylinder, means for maintaining the temperature of the walls of the housing above the temperature at which the gaseous aluminum chloride sublimes, means to cool the curved side wall of the cylinder below the temperature at which the gaseous aluminum chloride sublimes to cause it to condense on the side wall of the cylinder, scraper means fixed to the inside wall of the housing and located to engage the side wall of the cylinder and scrape off the condensed aluminum chloride, said outlet of the condenser section being located below the scraper means and includes a closed conduit connecting the outlet of the condenser section to a storage container to cause the solid aluminum chloride scraped off the cylinder to fall by gravity out of the condenser chamber through the outlet and closed conduit to said container, and means for varying the speed of rotation of the cylinder to vary the thickness of the layer of aluminum chloride scraped off by the scraper to thereby vary the particle size of the aluminum chloride produced.

References Cited
UNITED STATES PATENTS

| | | | |
|---|---|---|---|
| 2,194,250 | 3/1940 | Turek | 23—252 R |
| 3,549,331 | 12/1970 | Gould et al. | 23—263 |
| 2,849,293 | 8/1958 | Wendell, Jr. et al. | 23—281 |
| 3,341,283 | 9/1967 | Cleaver et al. | 423—495 X |

JAMES H. TAYMAN, JR., Primary Examiner

U.S. Cl. X.R.

23—277 R, 284, 293 A; 43—495, 494, 16; 165—94, 91